US007553534B2

(12) United States Patent
Bunker

(10) Patent No.: US 7,553,534 B2
(45) Date of Patent: Jun. 30, 2009

(54) FILM COOLED SLOTTED WALL AND METHOD OF MAKING THE SAME

(75) Inventor: Ronald Scott Bunker, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 345 days.

(21) Appl. No.: 11/511,840

(22) Filed: Aug. 29, 2006

(65) Prior Publication Data

US 2008/0057271 A1 Mar. 6, 2008

(51) Int. Cl.
*B32B 3/24* (2006.01)
*F01D 5/08* (2006.01)

(52) U.S. Cl. ..................... 428/137; 428/134; 416/97 R; 416/97 A; 415/115

(58) Field of Classification Search ................. 428/137, 428/134; 416/97 R, 97 A; 415/115
See application file for complete search history.

(56) References Cited

U.S. PATENT DOCUMENTS

| | | | | |
|---|---|---|---|---|
| 5,651,662 | A | 7/1997 | Lee et al. | |
| 5,660,525 | A | 8/1997 | Lee et al. | |
| 6,234,755 | B1 | 5/2001 | Bunker et al. | |
| 6,383,602 | B1 | 5/2002 | Fric et al. | |
| 6,719,529 | B2 * | 4/2004 | Tiemann | 416/97 R |

* cited by examiner

*Primary Examiner*—William P Watkins, III
(74) *Attorney, Agent, or Firm*—Patrick K. Patnode

(57) ABSTRACT

An article includes a substrate having a first surface and a second surface; a slot disposed in the second surface, the slot having a bottom surface substantially parallel to the second surface, a first sidewall, and a second sidewall, wherein the first sidewall is substantially perpendicular to the second surface and wherein the first sidewall includes a plurality of beveled edge portions in physical communication with the second surface and the bottom surface; and a plurality of passage holes extending through the substrate from the first surface to the bottom surface, wherein the plurality of passage holes are aligned within the slot such that at least one beveled edge portion is disposed between two passage holes.

20 Claims, 2 Drawing Sheets

FILM COOLED SLOTTED WALL AND METHOD OF MAKING THE SAME

BACKGROUND

The present disclosure generally relates to gas turbine engines, and, more specifically, to film cooled slotted walls therein such as those found in rotor blades, stator vanes, combustion liners and exhaust nozzles.

Gas turbine engines include a compressor for compressing ambient airflow, which is then mixed with fuel in a combustor and ignited for generating hot combustion gases. These hot combustion gases flow downstream over rotor blades, stator vanes, and out an exhaust nozzle, for example. In order to provide a suitable working-life of these components, they need to be suitably cooled. For example, a rotor blade or stator vane includes a hollow airfoil, wherein the outside of the airfoil is in contact with the combustion gases and the inside of the airfoil is provided with cooling air for cooling the airfoil. Film cooling holes are typically provided through the wall of the airfoil for channeling the cooling air through the wall for discharge to the outside of the airfoil to form a film cooling layer of air to protect the airfoil from the hot combustion gases.

In order to prevent the combustion gases from flowing backwardly into the airfoil through the film holes, the pressure of the cooling air inside the airfoil is maintained at a greater level than the pressure of the combustion gases outside the airfoil. The ratio of the pressure inside the airfoil to the pressure outside the airfoil is commonly referred to as the backflow margin. Further, the ratio of the cooling air mass velocity (the product of air velocity times density) to the mass velocity of the hot combustion gases along the outside of the airfoil is sometimes referred to as the blowing ratio.

Film cooling performance may be characterized in several ways. For example, one relevant indication of performance is referred to as the adiabatic wall film cooling effectiveness, which is referred to hereinafter as the cooling effectiveness. This particular parameter is related to the concentration of film cooling fluid at the surface being cooled. In general, the greater the cooling effectiveness, the more efficiently the surface can be cooled. A decrease in cooling effectiveness causes greater amounts of cooling air to be employed to maintain a certain cooling capacity, which in turn diverts air away from the combustion zone. This diversion of air can lead to problems, such as greater air pollution resulting from non-ideal combustion, and less efficient engine operation.

Accordingly, a continual need exists for improved film cooled walls to increase cooling effectiveness.

BRIEF SUMMARY

Disclosed herein are articles having film cooled slotted wall and methods of making the articles.

In one embodiment, an article comprises: a substrate having a first surface and a second surface; a slot disposed in the second surface, the slot having a bottom surface substantially parallel to the second surface, a first sidewall, and a second sidewall, wherein the first sidewall is substantially perpendicular to the second surface and wherein the first sidewall comprises a plurality of beveled edge portions in physical communication with the second surface and the bottom surface; and a plurality of passage holes extending through the substrate from the first surface to the bottom surface, wherein the plurality of passage holes are aligned within the slot such that at least one beveled edge portion is disposed between two passage holes.

In another embodiment, an article comprises: a substrate having a first surface and a second surface; a thermal barrier coating system disposed on the second surface; a slot disposed in the thermal barrier coating system, the slot having a bottom surface substantially parallel to the second surface, a first sidewall, and a second sidewall, wherein the first sidewall is substantially perpendicular to the second surface and wherein the first sidewall comprises a plurality of beveled edge portions in physical communication with the thermal barrier coating system and the bottom surface; and a plurality of passage holes extending through the substrate from the first surface to the bottom surface, wherein the plurality of passage holes are aligned within the slot such that at least one beveled edge portion is disposed between two passage holes.

In one embodiment, a method of making an article comprises: forming a slot in a second surface of a substrate such that the slot has a bottom surface substantially parallel to the second surface, a first sidewall, and a second sidewall, wherein the first sidewall is substantially perpendicular to the second surface and wherein the first sidewall comprises a plurality of beveled edge portions in physical communication with the second surface and the bottom surface; and forming a plurality of passage holes through the substrate from a first surface to the bottom of the slot such that the plurality of passage holes are aligned within the slot such at least one beveled edge portion is disposed between two passage holes.

The above described and other features are exemplified by the following Figures and detailed description.

BRIEF DESCRIPTION OF THE DRAWINGS

Referring to the exemplary drawings wherein like elements are numbered alike in the several Figures.

DETAILED DESCRIPTION

Disclosed herein are articles having a film cooled slotted wall. For ease in discussion, reference is hereinafter made to gas turbine engine components (e.g., rotor blades, stator vanes, combustion liners, exhaust nozzles, and the like) with the understanding that this disclosure can readily be applied to other articles. As will be discussed in greater detail, the article comprises a plurality of passage holes extending through a substrate from a first surface of the substrate to a bottom surface of a slot (trench) disposed in a second surface of the substrate. The plurality of passage holes are aligned within the slot such that at least one beveled edge portion of a sidewall of the slot is disposed between two passage holes. The remaining portions of the sidewall are substantially perpendicular to the second surface. It has been discovered that increased performance for both cooling and aerodynamics can be realized with the disclosed article compared to existing film-cooled articles.

In the following description, the term "substantially perpendicular" is used to refer to a feature that is 0 degrees to about 25 degrees of being normal to another surface. Similarly, the term "substantially parallel" is used to refer to a feature that is 0 degrees to about 10 degrees of being parallel to another surface. Additionally, an "upstream" direction refers to the direction from which the local flow is coming, while a "downstream" direction refers to the direction in which the local flow is traveling.

Figure 1:
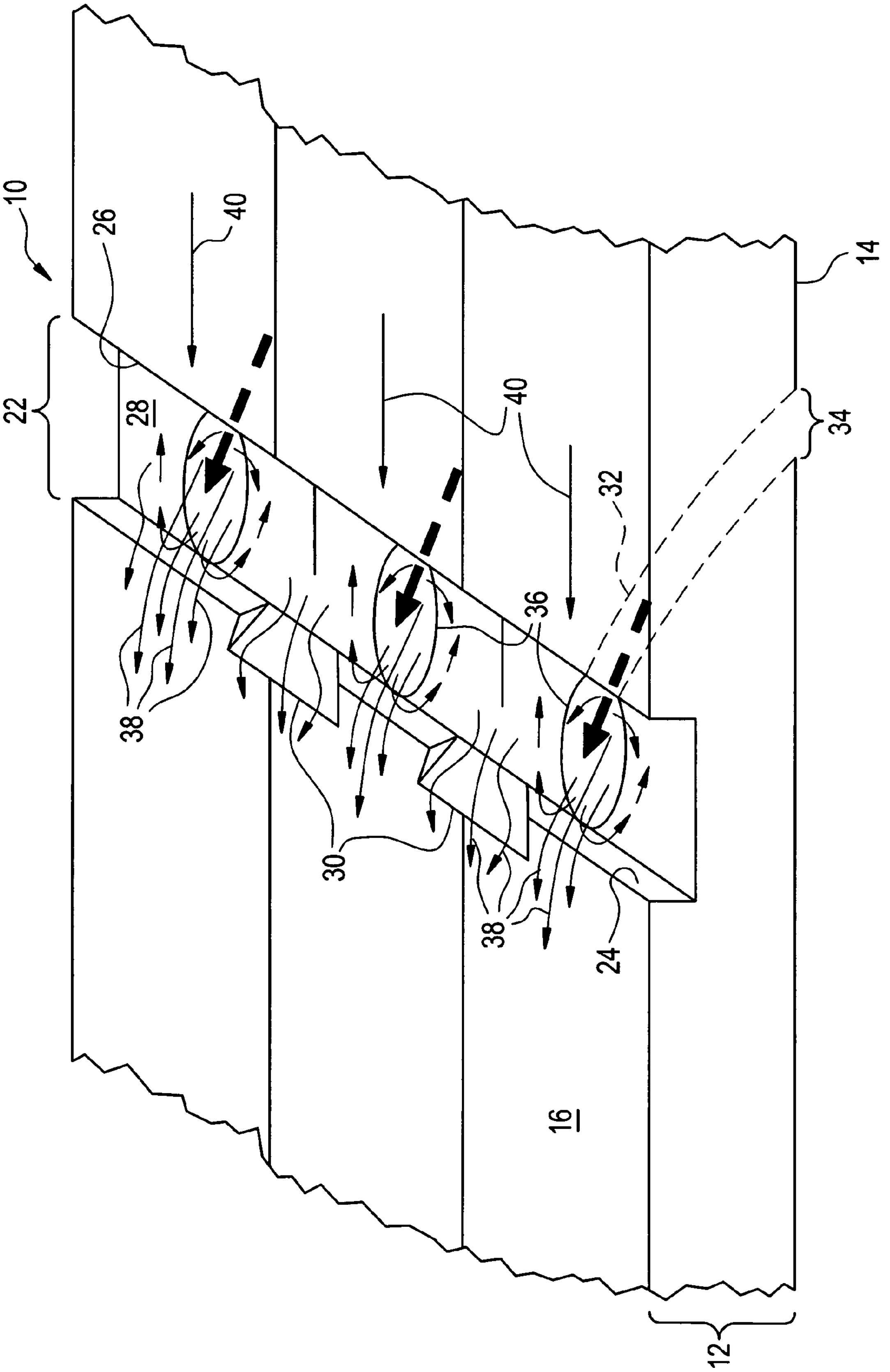
FIG. 1 is a prospective view of an embodiment of an article having a film cooled slotted wall.

Referring to FIG. 1, an article 10, such as a gas turbine engine component, is illustrated. The article 10 comprises a substrate 12 having a first surface 14 and a second surface 16. The first surface 14 may also be referred to as the "cool" surface, while the second surface 16 may be referred to as the "hot" surface, since the second surface 16 is generally exposed to relatively higher temperatures than the first surface 14 during operation. For example, in the case of gas turbine engine components, the second surface 16 may be exposed to gases having temperatures of at least about 1,000° C. Within this range, temperatures may even reach as high as 2,000° C., with temperatures of about 1,000° C. to about 1,600° C. common.

The material of the substrate 12 varies depending on the application. For example, for gas turbine engine components, the substrate 12 comprises a material capable of withstanding the desired operating conditions. Suitable materials include, but are not limited to, ceramics and metal-based materials. Non-limiting examples of metals include: steel; refractory metals such as titanium; and super alloys based on nickel, cobalt, or iron. However, it is to be understood that other embodiments are envisioned where the slot feature with beveled wall portion is used as an aerodynamic feature rather than a cooling feature, as such the substrate 12 can comprise a material that tolerates lower heat loads then those mentioned above. For example, the substrate 12 can comprise aluminum.

In one embodiment, the first surface 14 of the substrate 12 is opposite the second surface 16 of the substrate 12. For example, the first surface 14 and the second surface 16 can be parallel to each other. Disposed in the second surface 16 is a slot 22, which may also be referred to as a trench. The slot 22 can extend longitudinally completely across the second surface 16 or partially across the second surface 16. The slot 22 comprises a first sidewall 24, a second sidewall 26, and a bottom surface 28. The bottom surface 28 is substantially parallel to the second surface 16. In one embodiment, the second sidewall 26 can be substantially perpendicular to the second surface 16. The first sidewall 24 is substantially perpendicular to the second surface 16, but also comprises a plurality of beveled edge portions 30. It is further noted that the first sidewall 24 is downstream from the second sidewall 26 in terms of fluid flow during operation.

The beveled edge portion 30 includes an inclined surface in physical communication with the second surface 16 and the bottom surface 28 of the slot 22. While the shape of the beveled edge portion 30 varies depending on the application, the shape is suited to keep cooling fluid (e.g., air) on the second surface 16 during operation. Additionally, the beveled edge portion 30 can have a shape suited to spread cooling fluid laterally onto the second surface 16 during operation. The shape of each beveled edge portion can be the same or different than each other. Suitable shapes include, but are not limited to, an inclined dove-tail-like shape (or diffuser, or fan shape), an inclined v-shape, and inclined rectangular shape. It is also noted that the edges of the shapes can be sharp or rounded to various degrees. The slot 22 including the beveled edge portions 30 can be formed by any suitable method including, but not limited to, laser- or water-jet machining.

A plurality of passage holes 32 are longitudinally spaced apart from each other, and extend through the substrate 12 from the first surface 14 of the substrate to the bottom surface 28 of slot 22. In one embodiment, the passage holes 32 are inclined, that is, they are disposed at an angle through the substrate. For example, the passage holes 32 can be inclined at an angle of about 10 degrees to about 60 degrees, specifically an angle of about 20 degrees to about 40 degrees. The shape of the component, its cooling requirements, and the like, determines the particular angle of the passage holes 32. Angling of the passage holes through the substrate advantageously reduces blow-off, thereby improving film cooling effectiveness.

The diameter of the passage holes 32 may be uniform or, alternatively may vary. For example, in one embodiment, the throat 34 of each passage hole 32 is substantially cylindrical, while the break-out region 36 of the passage hole 32 can be elliptical, diffusion-shaped, or any other suitable geometry. The break-out region 36 of the passage hole 32 is the region at which the passage hole 32 terminates at the bottom surface 28 of the slot 22. A suitable example of a diffuser-shaped hole includes those illustrated and discussed in U.S. Pat. No. 6,234,755, which is herein incorporated by reference in its entirety.

The plurality of passage holes 32 are aligned within the slot 22 such that at least one beveled edge portion 30 of the first sidewall 24 is disposed between two holes 32. This configuration advantageously allows the substantially perpendicular portion of the first sidewall to act as a blockage feature causing cooling fluid to be laterally dispersed within the slot 22 during operation. Further, the beveled edge portion 30 allows the cooling fluid to be kept near the second surface 16, while also spreading cooling fluid laterally onto the second surface 16 during operation. The combination of a blockage function with a diffusing function of fluid flow advantageously increases performance for both cooling and aerodynamics compared to existing film cooled articles.

In operation, cooling fluid such as compressed air travels from a source in fluid communication with the first surface 12 into the slot 22. The cooling fluid is illustrated, for example, as arrows 38. The cooling fluid exiting the break-out region 36 of the passage holes 32 is substantially blocked by the substantially perpendicular portions of the first sidewall 24, which causes the cooling fluid to be laterally dispersed within the slot 22. However, as illustrated, some cooling fluid may travel over the first sidewall 24. Advantageously, the beveled edge portions 30 allow the cooling fluid to be transferred from the slot 22 to the second surface 16 such that the cooling fluid is kept near the second surface 16. Additionally, the beveled edge portion 30 spreads cooling air laterally onto the second surface 16. Lines 40 represent hot exhaust gases flowing over the cooling fluid on the second surface 16. The cooling fluid forms a cooling film on the second surface 16, which acts to at least reduce the incident heat flux reaching the second surface 16.

Figure 2:
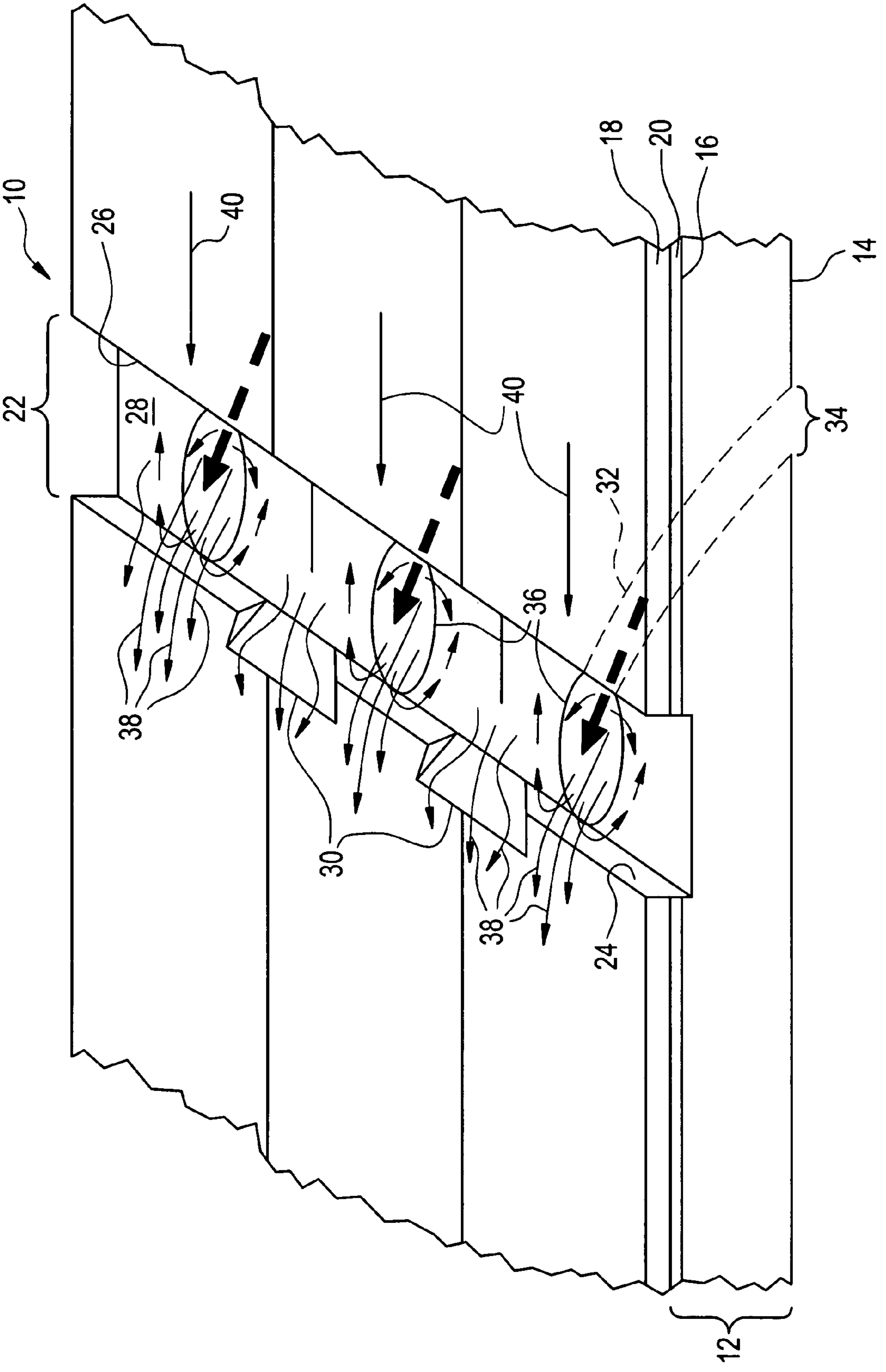
FIG. 2 is a prospective view of an embodiment of an article having a film cooled slotted wall comprising a thermal barrier coating system.

Referring to FIG. 2, an article 50 such as a gas turbine engine component is illustrated. The article 50 comprises the substrate 12 having the first surface 14 and the second surface 16. An optional thermal barrier coating (TBC) system 18 is disposed in the second surface 16 to protect the second surface 16 from corrosion and/or to increase the operating temperature at which the substrate 12 can be exposed, as well as protect an optional bond layer 20 from oxidation. It is to be understood that while the TBC system 18 is illustrated as a single layer, the TBC system 18 may comprise several layers. In a multi-layer TBC system, each layer can comprise similar or different compositions than other layers. Additionally, the thickness of each layer can be the same or different.

The TBC system 18 may be directly bonded to the second surface 16, in some embodiments, or an optional bond layer 20 may be employed to improve adhesion of the TBC system 18 to the substrate 12. The bond layer 20 may be applied by a variety of techniques including, but not limited to, physical vapor deposition (PVD), chemical vapor deposition (CVD), or a thermal spray process. Examples of thermal spray processes include, but are not limited to, vacuum plasma deposition, high velocity oxy-fuel (HVOF), and air plasma spray (APS). Combinations of thermal spray and CVD techniques may also be employed.

In one embodiment, the bond layer 20 is formed of a material comprising "MCrAlY", where "M" represents iron, nickel, or cobalt. In other embodiments, the bond layer 20 comprises an aluminide or noble metal-aluminide material (e.g., platinum-aluminide). The TBC system 18 can then be applied over the bond layer 20. In the case of turbine airfoils, the TBC system 18 can be a zirconia-based material stabilized with an oxide such as yttria. The TBC system 18 may be applied by a variety of techniques including, but not limited to, a thermal spray technique and electron beam physical vapor deposition (EB-PVD).

Disposed in the TBC system 18 is the slot 22, which may or may not extend to the optional bond layer 20 or the second surface 16. Further, the slot 22 can extend longitudinally across the TBC system 18 either completely across the TBC system 18 or partially across the TBC system 18. The slot 22 comprises the first sidewall 24, the second sidewall 26, and the bottom surface 28. The bottom surface 28 is substantially parallel to the second surface 16. In one embodiment, the second sidewall 26 can be substantially perpendicular to the second surface 16. The first sidewall 24 is substantially perpendicular to the second surface 16, but also comprises a plurality of beveled edge portions 30. It is further noted that the first sidewall 24 is downstream from the second sidewall 26 in terms of fluid flow during operation.

The beveled edge portions 30 include an inclined surface in physical communication with the TBC system 18 and the bottom surface 28 of the slot 22. The plurality of passage holes 32 are longitudinally spaced apart from each other, and extend through the substrate 12 from the first surface 14 of the substrate to the bottom surface 28 of slot 22. In one embodiment, the throat 34 of each passage hole 32 is substantially cylindrical, while the break-out region 36 of the passage hole 32 can be elliptical, diffusion-shaped, or any other suitable geometry. The break-out region 36 of the passage hole 32 is the region at which the passage hole 32 terminates at the bottom surface 28 of the slot 22. The plurality of passage holes 32 are aligned within the slot 22 such that at least one beveled edge portion 30 of the first sidewall 24 is disposed between two passage holes 32.

It is to be understood that the articles disclosed herein can comprise more than one slot, which may or may not extend over the entire second surface 16. In the optional additional slots, the number, shape, and arrangement of the passage holes may be the same or different than that of the passage holes 32. Further, the shape of the beveled edge portions may be the same or different than that of the beveled edge portion 30.

Advantageously, increased performance for both cooling and aerodynamics can be realized with the disclosed article compared to existing film-cooled articles. Further, manufacturing of the article also becomes easier when beveled regions are employed as opposed to completely sharp perpendicular edges. Additionally, removing the sidewall material (beveling) reduces the risk to lose of the material in operation.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An article comprising:

a substrate having a first surface and a second surface;

a slot disposed in the second surface, the slot having a bottom surface substantially parallel to the second surface, a first sidewall, and a second sidewall, wherein the first sidewall is substantially perpendicular to the second surface and wherein the first sidewall comprises a plurality of beveled edge portions in physical communication with the second surface and the bottom surface; and a plurality of passage holes extending through the substrate from the first surface to the bottom surface, wherein the plurality of passage holes are aligned within the slot such that at least one beveled edge portion is disposed between two passage holes.

2. The article of claim 1, wherein the second sidewall is substantially perpendicular to the second surface.

3. The article of claim 1, wherein at least one passage hole of the plurality of passage holes comprises a diffuser shape.

4. The article of claim 1, wherein the plurality of passage holes extends through the substrate at an angle.

5. The article of claim 4, wherein the angle is about 10 degrees to about 60 degrees.

6. The article of claim 5, wherein the angle is about 20 degrees to about 40 degrees.

7. The article of claim 1, wherein the first surface and the second surface are opposite each other and are parallel.

8. The article of claim 1, wherein the substrate comprises a ceramic or metal-based material.

9. The article of claim 1, wherein the beveled edge portions comprise a shape selected from the group consisting of a dove-tail-like shape, an inclined v-shape, and an inclined rectangular shape.

10. An article comprising:

a substrate having a first surface and a second surface;

a thermal barrier coating system disposed on the second surface;

a slot disposed in the thermal barrier coating system, the slot having a bottom surface substantially parallel to the second surface, a first sidewall, and a second sidewall, wherein the first sidewall is substantially perpendicular to the second surface and wherein the first sidewall comprises a plurality of beveled edge portions in physical communication with the thermal barrier coating system and the bottom surface; and a plurality of passage holes extending through the substrate from the first surface to the bottom surface, wherein the plurality of passage holes are aligned within the slot such that at least one beveled edge portion is disposed between two passage holes.

11. The article of claim 10, wherein the thermal barrier coating system is disposed in direct physical communication with the second surface.

12. The article of claim 10, further comprising a bond layer disposed between and in direct physical communication with the thermal barrier coating system and the second surface.

13. The article of claim 10, wherein the slot extends to the second surface.

14. The article of claim 10, wherein the thermal barrier coating system comprises a zirconia-based material stabilized with an oxide.

15. A method of making an article, comprising:

forming a slot in a second surface of a substrate such that the slot has a bottom surface substantially parallel to the second surface, a first sidewall, and a second sidewall, wherein the first sidewall is substantially perpendicular to the second surface and wherein the first sidewall comprises a plurality of beveled edge portions in physical communication with the second surface and the bottom surface; and forming a plurality of passage holes through the substrate from a first surface to the bottom of the slot such that the plurality of passage holes are aligned within the slot such that at least one beveled edge portion is disposed between two passage holes.

16. The method of claim 15, wherein the slot and beveled edge portions are formed using laser- or water-jet machining.

17. The method of claim 15, wherein the passage holes are formed at an angle through the substrate.

18. The method of claim 15, wherein the angle is about 10 degrees to about 60 degrees.

19. The method of claim 15, further comprising forming a thermal barrier coating system on the second surface such that the thermal barrier coating system forms an outer layer of the second surface.

20. The method of claim 15, wherein the beveled edge portions comprise a shape selected from the group consisting of a dove-tail-like shape, an inclined v-shape, and an inclined rectangular shape.

* * * * *